(12) United States Patent
Mu et al.

(10) Patent No.: US 9,998,809 B2
(45) Date of Patent: Jun. 12, 2018

(54) LOUDSPEAKER MODULE

(71) Applicant: GOERTEK INC., Weifang (CN)

(72) Inventors: Zongjun Mu, Weifang (CN); Jianbin Yang, Weifang (CN)

(73) Assignee: GOERTEK INC., Weifang (CN)

( * ) Notice: Subject to any disclaimer, the term of this patent is extended or adjusted under 35 U.S.C. 154(b) by 0 days. days.

(21) Appl. No.: 15/327,652

(22) PCT Filed: Nov. 24, 2015

(86) PCT No.: PCT/CN2015/095420
§ 371 (c)(1),
(2) Date: Jan. 19, 2017

(87) PCT Pub. No.: WO2016/101746
PCT Pub. Date: Jun. 30, 2016

(65) Prior Publication Data
US 2017/0289658 A1    Oct. 5, 2017

(30) Foreign Application Priority Data
Dec. 26, 2014   (CN) .......................... 2014 1 0828171

(51) Int. Cl.
*H04R 1/02*   (2006.01)
*H04M 1/03*   (2006.01)
(Continued)

(52) U.S. Cl.
CPC .............. *H04R 1/02* (2013.01); *H04M 1/035* (2013.01); *H04R 1/2807* (2013.01);
(Continued)

(58) Field of Classification Search
CPC ........ H04R 1/02; H04R 1/021; H04R 1/2807; H04R 1/2811; H04R 1/2823;
(Continued)

(56) References Cited

U.S. PATENT DOCUMENTS

2004/0240688 A1    12/2004   Chiang et al.
2005/0190941 A1*    9/2005   Yang ..................... H04R 1/2819
                                                                    381/351
(Continued)

FOREIGN PATENT DOCUMENTS

CN        102711023 A     10/2012
CN        203368742 U     12/2013
(Continued)

OTHER PUBLICATIONS

International Search Report and Written Opinion dated Jan. 26, 2016 for PCT Application No. PCT/CN2015/095420.
(Continued)

*Primary Examiner* — Joshua Kaufman
(74) *Attorney, Agent, or Firm* — Moser Taboada

(57) ABSTRACT

A loudspeaker module comprises an outer casing in which a vibration system and a magnetic circuit system are received. The magnetic circuit system comprises a basin-like stand fixed on the outer casing. The outer casing comprises a second casing provided with a rear sound exit hole that transversely runs through the inner side surface and the outer side surface of the second casing at the position corresponding to the outer side surface of the sidewall of the basin-like stand. The rear sound exit hole is communicated with an inner cavity of the module and an inner cavity of the electronic terminal. A chamfered plane is disposed at an upper end of the sidewall of the basin-like stand, and on a side of the sidewall of the basin-like stand. A sound emitting channel is formed between the chamfered plane and the inner side surface of the second casing.

10 Claims, 2 Drawing Sheets

(51) Int. Cl.
*H04R 9/06* (2006.01)
*H04R 9/02* (2006.01)
*H04R 1/28* (2006.01)
*H04R 1/06* (2006.01)

(52) U.S. Cl.
CPC ......... *H04R 1/2826* (2013.01); *H04R 1/2888* (2013.01); *H04R 9/025* (2013.01); *H04R 9/06* (2013.01); *H04R 1/06* (2013.01); *H04R 2209/024* (2013.01); *H04R 2499/11* (2013.01)

(58) Field of Classification Search
CPC .. H04R 1/2826; H04R 1/2838; H04R 1/2842; H04R 1/2846; H04R 1/2849; H04R 1/2884; H04R 1/2888; H04R 9/025; H04R 9/06; H04R 2209/024; H04R 2400/11; H04R 2499/11
See application file for complete search history.

(56) References Cited

U.S. PATENT DOCUMENTS

2006/0153417 A1\* 7/2006 Furuya ................ H04M 1/035
381/396

2012/0155693 A1 6/2012 Wei
2014/0133684 A1 5/2014 Zha et al.
2014/0294225 A1 10/2014 Ji et al.

FOREIGN PATENT DOCUMENTS

| CN | 103747398 A | 4/2014 |
| CN | 203574855 U | 4/2014 |
| CN | 203618117 U | 5/2014 |
| CN | 104159179 A | 11/2014 |
| CN | 104168528 A | 11/2014 |
| CN | 104202700 A | 12/2014 |
| CN | 204031434 U | 12/2014 |
| CN | 204046810 U | 12/2014 |
| CN | 104540080 A | 4/2015 |
| CN | 204291357 U | 4/2015 |
| JP | 3166531 B2 | 5/2001 |

OTHER PUBLICATIONS

Chinese Office Action for Application No. 201410828171.3, filling date Dec. 26, 2014.
European Search Report dated Jul. 26, 2017 for Application No. 15871815.5.

\* cited by examiner

LOUDSPEAKER MODULE

TECHNICAL FIELD

The present disclosure relates to the technical field of electroacoustic products, and particularly to a loudspeaker module.

BACKGROUND

A loudspeaker module is an important acoustic component in a portable electronic terminal and used to perform conversion between an electrical signal and a sound signal, and serves as an energy conversion device. The current loudspeaker module usually comprises a casing in which a speaker unit is received, and the speaker unit comprises a vibration system and a magnetic circuit system. An inner cavity of the current loudspeaker module is divided by the vibration system into two cavities: one is a front acoustic cavity located in front of the vibration system, the front acoustic cavity being communicated with a front sound exit hole of the loudspeaker module and being used to propagate out sound emitted by the speaker unit; the other one is a rear acoustic cavity behind the vibration system. The rear acoustic cavity is a closed cavity and used to boost low-frequency performance of the loudspeaker module and prevent acoustic short-circuiting. To achieve the acoustic performance of the loudspeaker module, the rear acoustic cavity usually needs to have a certain volume, which causes a larger volume of the loudspeaker module. However, the current portable electronic terminal develops in a light-weighted, thinner and compact direction, for example, a Pad (a tablet personal computer) becomes smaller and thinner. In this case, a larger loudspeaker module cannot be installed in the electronic terminal, and cannot meet needs of the electronic terminals which are getting increasingly lighter and thinner.

SUMMARY

In view of the above defects, the technical problem to be solved by the present disclosure is to provide a loudspeaker module whose size is minimized without damaging acoustic performance, and which can meet needs of a light-weighted, thinner and compact electronic terminal.

To solve the above technical problem, the present disclosure employs the following technical solutions:

A loudspeaker module, installed in an interior of an electronic terminal, comprises an outer casing in which a vibration system and a magnetic circuit system are received, the magnetic circuit system comprises a basin-like stand fixed on the outer casing, a magnet and a washer are fixed in turn in the basin-like stand, a position of the outer casing corresponding to a sidewall of the basin-like stand is provided with a rear sound exit hole, the rear sound exit hole is communicated with an inner cavity of the module and an inner cavity of the electronic terminal; a chamfered plane is disposed at an upper end of the sidewall of the basin-like stand corresponding to the rear sound exit hole, and the chamfered plane is disposed on a side of the sidewall of the basin-like stand adjacent to the rear sound exit hole.

Preferably, the module is a rectangular structure, and the chamfered plane is disposed on both sidewalls on opposite sides of the basin-like stand.

Preferably, the outer casing comprises a first casing and a second casing which are engaged together, the rear sound exit hole is disposed on the sidewall on one side of the second casing, and the basin-like stand is fixed on the second casing.

Preferably, three the rear sound exit holes are equidistantly distributed on the sidewall on the same side of the second casing.

Preferably, fixing flanges engaged with an upper end face of the sidewall of the basin-like stand are disposed inside the sidewall of the second casing provided with the rear sound exit holes, and are discontinuously disposed inside the second casing away from the respective rear sound exit holes.

Preferably, a plurality of raised walls are discontinuously disposed at an upper end of the sidewall of a side of the second casing not provided with the rear sound exit holes, and upper end faces of the raised walls all flush with upper end faces of the remaining three sidewalls of the second casing; after the first casing is engaged with the second casing, spaces between the raised walls form front sound exit holes of the module.

Preferably, the rear sound exit holes and the front sound exit holes are respectively disposed on opposite sides of the module.

Preferably, a fixing flange engaged with the upper end face of the sidewall of the basin-like stand is further disposed inside the sidewall of the side of the second casing provided with the raised walls, and the fixing flange on said side is continuously disposed.

Preferably, the module further comprises a third casing, the first casing is engaged with an upper end of the second casing, and the third casing is engaged with a lower end of the second casing.

Preferably, the third casing is a frame structure with an opening on one side, the opening side of the third casing corresponds to the side of the second casing provided with the raised walls, upwarping engaging portions are disposed on the opening side of the third casing, and grooves for receiving the engaging portions are disposed at positions of a lower end of the second casing corresponding to the engaging portions.

The present disclosure achieves the following advantageous effects after employing the above technical solutions:

In the present disclosure, the rear sound exit holes are disposed at positions of the outer casing of the loudspeaker module corresponding to the sidewall of the basin-like stand, and the rear sound exit holes are communicated with the inner cavity of the module and the inner cavity of the electronic terminal; the chamfered plane is disposed at an upper end of the sidewall of the basin-like stand corresponding to the rear sound exit holes, and the chamfered plane is disposed on the side of the sidewall of the basin-like stand adjacent to the rear sound exit holes. The interior of the loudspeaker module of the present disclosure is not provided with the rear acoustic cavity, and air stream behind the diaphragm enters through the rear sound exit holes disposed on the outer casing into the cavity of the electronic terminal. Using space between electronic elements in the interior of the electronic terminal, the present disclosure enhances the low-frequency performance of the loudspeaker module, prevents sound short-circuiting, equates the space between electronic elements in the interior of the electronic terminal as the original rear acoustic cavity in the interior of the module, minimizes the volume while ensuring the acoustic performance of the loudspeaker module, saves internal space of the electronic terminal, provides an expansion space for other electronic elements (such as battery, screen and the like) in the electronic terminal, and meanwhile more facilitates heat dissipation of the module and improves stability of the module; in addition, since the sidewall of the basin-like stand is provided with the chamfered plane, the space between the basin-like stand sidewall and the outer casing of the module is increased, the air stream circulation channel is enlarged so that air stream circulates more smoothly, low-frequency distortion is avoided, and the acoustic performance of the module is further improved.

Sidewalls on both opposite sides of the basin-like stand are provided with the chamfered plane. Provision of the chamfered plane on both sides simplifies assembling steps. A worker may directly install without need to distinguish the side with the chamfered plane from the side without the chamfered plane upon assembling, thereby improving the assembling speed.

Fixing flanges engaged with the upper end face of the sidewall of the basin-like stand are disposed inside the sidewall of the second casing, so the fixing flanges function to limit the basin-like stand, meanwhile increase a contact area between the second casing and the basin-like stand, increase an engagement strength of the basin-like stand and the second casing, reduces a probability of disengagement of the basin-like stand from the second casing, improves stability of the loudspeaker module and prolongs the service life of the module.

The third casing is a frame structure with an opening on one side, and the opening side of the third casing corresponds to the side of the second casing provided with the raised walls. Therefore, such structure of the third casing may make the bottom of the basin-like stand and the lower end of the sidewall of one side exposed outside the module, and further reduces the volume of the module and reduces the height of the module as an outer surface of the bottom of the basin-like stand flushes with an outer surface of the third casing.

To conclude, the loudspeaker module according to the present disclosure solves technical problems in the prior art such as large volume and likely low-frequency distortion of the loudspeaker module. The loudspeaker module of the present disclosure minimizes the volume while ensuring the acoustic performance of the loudspeaker modules, meets the needs of lightweighted, thinner and slimmer electronic terminals, and exhibits high stability and long service life.

BRIEF DESCRIPTION OF THE DRAWINGS

The accompanying drawings are only intended to illustrate preferred embodiments and not construed as limiting the present disclosure. In the drawings.

Figure 1:
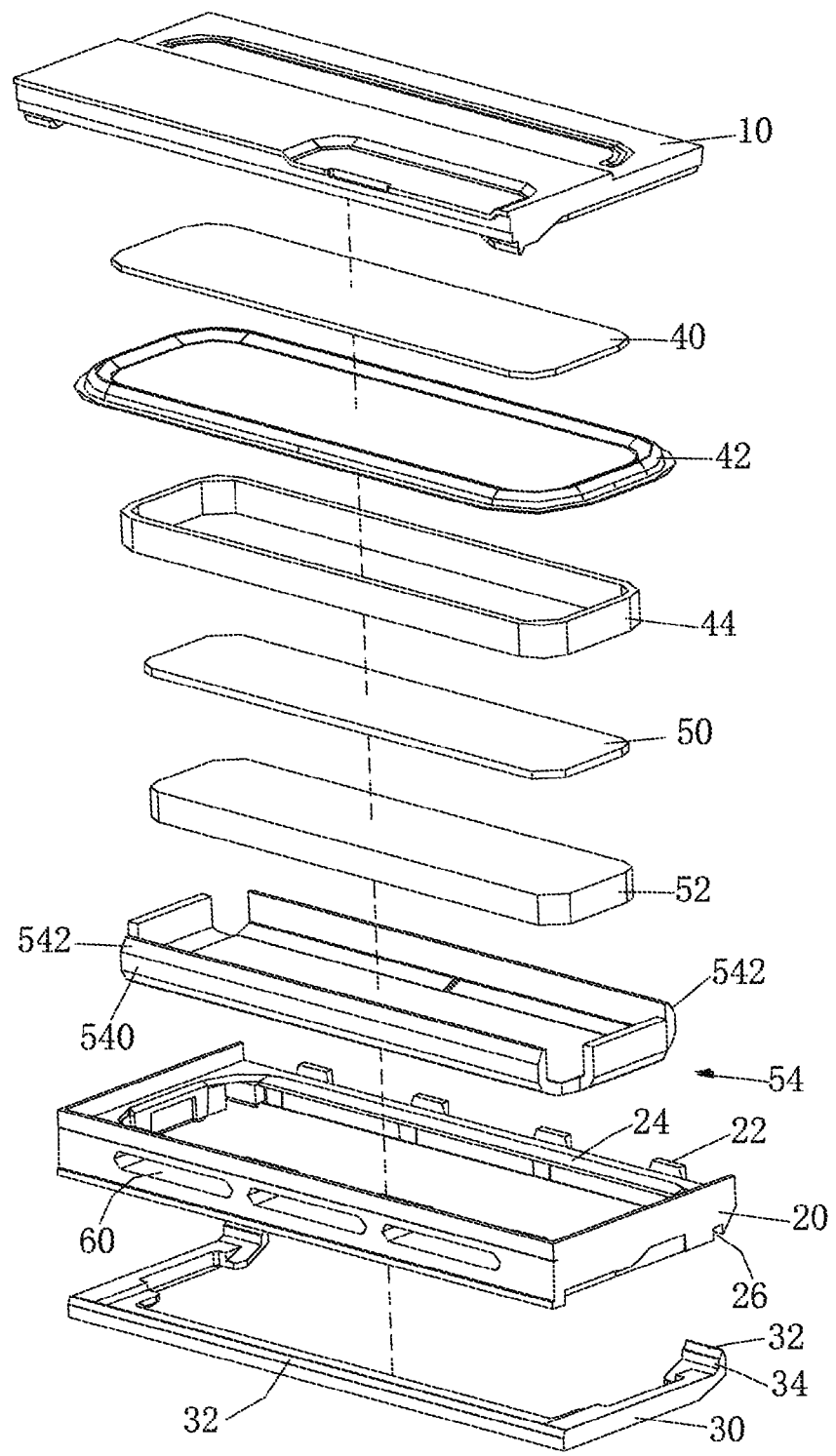
FIG. 1 is an exploded perspective structural schematic view of a loudspeaker module according to the present disclosure.

In the figures, the reference number 10 denotes first casing, 20 second casing, 22 raised wall, 24 fixing flange, 26 groove, 30 third casing, 32 ultrasonic line, 34 an engaging portion, 40 dome, 42 diaphragm, 44 voice coil, 50 washer, 52 magnet, 54 basin-like stand, 540 sidewall, 542 chamfered plane, 60 rear sound exit hole, 62 front sound exit hole, 70 electronic terminal, 72 electronic element, 80 rear acoustic cavity.

DETAILED DESCRIPTION

The present disclosure will be further illustrated with reference to the drawings and embodiments.

The orientation "up" involved in the present description refers to a direction of a vibration system of a speaker unit, and the orientation "down" refers to a direction of a magnetic circuit system of the speaker unit. "Inside" of the casing involved in the present description refers to a side located in the module inner cavity, and "outside" of the casing refers to a side located outside the module inner cavity.

As jointly shown in FIG. 1, FIG. 2, FIG. 3 and FIG. 4, a loudspeaker module is installed in an interior of an electronic terminal such as Pad and is a cuboid structure. The loudspeaker module comprise an outer casing comprised of a first casing 10, a second casing 20 and a third casing 30 which are engaged together in turn, and a speaker unit is received in a space enclosed by the first casing 10, the second housing 20 and third casing 30. The speaker unit comprises a vibration system and a magnetic circuit system. The second casing 20 is a cuboid frame structure with both ends open, the first casing 10 is engaged with an upper end of the second casing 20, and the third casing 30 is engaged with a lower end of the second casing 20. A front sound exit hole 62 of the module is located on one long edge side of the module between the first casing 10 and second casing 20, and sound coming from the speaker unit spreads through the front sound exit hole 62 to the external of the module. A rear sound exit hole 60 of the module is provided on the second casing 20 on the other long edge side of the module, air stream behind the vibration system enters through the rear sound exit hole 60 into an inner cavity of an electronic terminal 70, a space between electronic elements 72 in the electronic terminal 70 forms a rear acoustic cavity 80 of the module, functioning to improve low-frequency performance of the module and prevent acoustic short-circuiting. The front sound exit hole 62 and rear sound exit hole 60 are disposed on opposite sides of the module.

Figure 3:
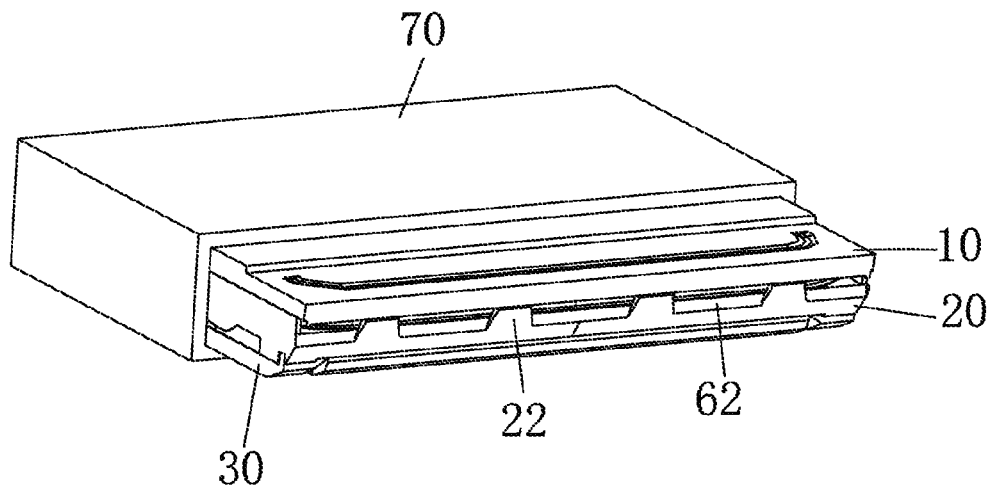
FIG. 3 is a schematic view showing the loudspeaker module engaged with an electronic terminal according to the present disclosure.
Figure 4:
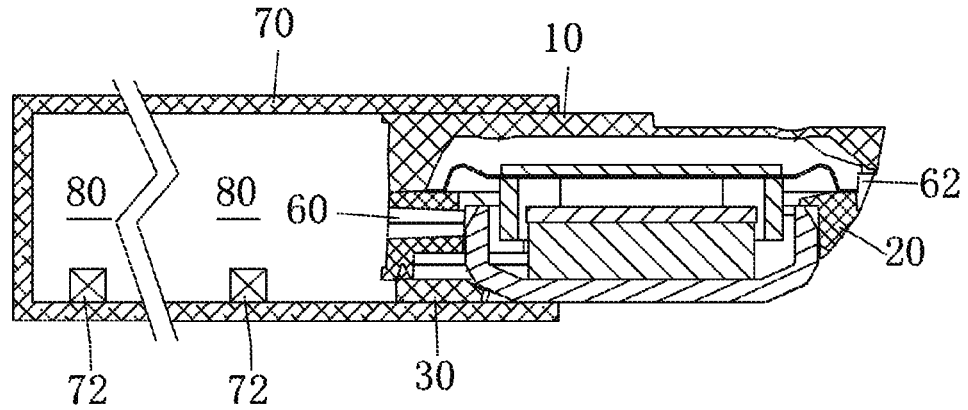
FIG. 4 is a sectional schematic view showing the loudspeaker module engaged with an electronic terminal according to the present disclosure.

The structure that the electronic terminal is engaged with the loudspeaker module shown in FIG. 3 and FIG. 4 is only a simpler structural illustration. In practical application, since structures of electronic terminals are not completely the same, the engagement scheme of the electronic terminal and the loudspeaker module needs to be adjusted according to actual situations, and is not limited to the engagement manner shown in FIG. 3 and FIG. 4 so long as the rear acoustic cavity 80 enclosed by the electronic terminal is sealedly isolated from the front sound exit hole 62 of the loudspeaker module. Those skilled in the art, according to the depictions of the description and without making any inventive efforts, may implement the manner of engaging the electronic terminal with the loudspeaker module and forming the rear acoustic cavity external of the loudspeaker module, so other engagement manners of the electronic terminal and the loudspeaker module will not be detailed one by one. In addition, the electronic element 72 shown in FIG. 4 is only an illustrative structure. In practice, since the number, shape and distribution of electronic elements in the electronic terminal vary with types and models of the electronic terminals, it will be too complicated to show all electronic elements one by one in kind, and furthermore, this portion is not an inventive point of the present disclosure. Hence, the electronic elements 72 are exemplarily illustrated in FIG. 4.

Figure 2:
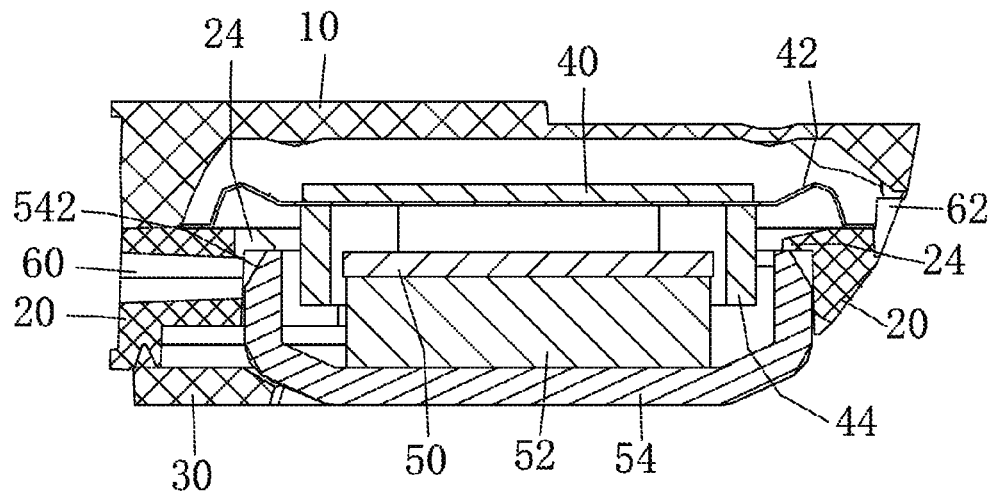
FIG. 2 is a sectional structural schematic view of the loudspeaker module according to the present disclosure.

As jointly shown by FIG. 1 and FIG. 2, the vibration system comprises a diaphragm 42 whose edge portion is fixed on an upper end of the second casing 20, a dome 40 is fixed at a middle position of a side of the diaphragm 42 adjacent to the first casting 10, and a voice coil 44 is fixed on the other side of the diaphragm 42. The magnetic circuit system comprises a basin-like stand 54 whose sidewall 540 is fixed inside the second casing 20, a magnet 52 and a washer 50 are fixed in turn at a middle position inside the basin-like stand 54, a magnetic gap is provided between the magnet 52 and the washer 50 and the sidewall 540, and an end of the voice coil 44 is located in the magnetic gap. The voice coil 44 moves reciprocatingly up and down in the magnetic gap according to a magnitude and direction of a sound wave electrical signal running through windings thereof, the diaphragm 42 and dome 40 vibrate along with up-down movement of the voice coil 44, urge air to generate a sound and thereby complete electro-acoustic energy conversion.

As jointly shown in FIG. 1 and FIG. 2, the rear sound exit hole 60 is disposed on a sidewall of one long-edge side of the second casing 20, a total of three such rear sound exit holes are provided, and the three rear sound exit holes 60 are equidistantly distributed at the same height of the sidewall on the side of the second casing 20. The rear sound exit holes 60 all transversely run through the sidewall of the side of the second casing 20, openings of the rear sound exit holes 60 located inside the second casing 20 are aligned with an upper half of the sidewall 540 of the basin-like stand 54, a chamfered plane 542 is disposed on one side of the upper end of the sidewall 540 adjacent to the rear sound exit hole 60, sidewalls 540 on two long edge sides of the basin-like stand 54 are both provided with the chamfered plane 542, the chamfered planes 542 increase the space between the basin-like stand sidewalls 540 and the second casing 20, increase an air stream circulation channel, reduce resistance of air stream circulation so that the air stream circulation behind the diaphragm 42 is made smoother, low-frequency distortion is effectively avoided, and the acoustic performance of the module is further improved. In practical application, the need of air stream circulation may be satisfied by providing the chamfered plane 542 on the sidewall of one long-edge side of the basin-like stand 54 because the rear sound exit holes 60 are only provided on one long edge side of the second casing 20. However, if the chamfered plane 542 is provided only on the sidewall of one side of the basin-like stand 54, a worker needs to carefully discern an installation direction of the basin-like stand 54 upon assembling, which increases the assembling difficulty and slows down the assembling speed. Hence, in the present embodiment the chamfered planes 542 are preferably arranged on the sidewalls on both long-edge sides of the basin-like stand 54.

As jointly shown by FIG. 1 and FIG. 2, a plurality of fixing flanges 24 extending toward the interior of the module are disposed inside the sidewall of the second casing 20 provided with the rear sound exit holes 60, each of the fixing flanges 24 is disposed at a position above the rear sound exit holes 60, a lower surface of each of the fixing flanges 24 is engaged with an upper end face of the sidewall 540 on the side of the basin-like stand 54, the fixing flanges 24 are discontinuously disposed inside the second casing 20 and arranged away from the rear sound exit holes 60 to ensure no blocking of the air stream circulation. Fixing flanges 24 extending towards the interior of the module and having the same structure are also disposed at the same height inside the sidewall of the other long-edge side of the second casing 20 and they needn't be arranged away from the sound exit holes. Hence, the fixing flanges 24 on the sidewall of this side are continuously disposed inside the second casing 20. The fixing flanges 24 function to limit the basin-like stand 54, meanwhile increase a contact area between the second casing 20 and the basin-like stand 54, increase an engagement strength of the basin-like stand 54 and the second casing 20, reduces a probability of disengagement of the basin-like stand 54 from the second casing 20, improves stability of the loudspeaker module and prolongs the service life of the module.

As jointly shown by FIG. 1, FIG. 2 and FIG. 3, an upper end of the sidewall of the long-edge side of the second casing 20 not provided with the rear sound exit holes 60 is discontinuously provided with four raised walls 22 which are in fact protrusions between recesses formed by incomplete filling on the upper portion of the sidewall of the side of the second casing 20. An upper end face of each of the raised walls 22 flushes with the upper end faces of sidewalls of the remaining three sides of the second casing 20. After the first casing 10 is engaged with the second casing 20, recesses between the raised walls 22 form the front sound exit holes 62 of the module, and sound from the speaker unit spreads out from the front sound exit holes 62. The loudspeaker module according to the present disclosure is a module wherein sound comes out from a side. The front sound exit hole structures formed by snap-fitting the first casing 10 and second casing 20 simplify the structures of respective casings, lower processing difficulty of respective casings, and meanwhile reduce the overall height of the module.

As jointly shown by FIG. 1, FIG. 2 and FIG. 3, the third casing 30 is a frame structure with an opening on one side, the opening side of the third casing 30 corresponds to the side of the second casing 20 provided with the raised walls 22. A length of the opening accords with that of the sidewall 540 of the basin-like stand 54, a bottom of the basin-like stand 54 and a lower end of the sidewall 540 on the side are both exposed outside the module, an outer surface of the bottom of the basin-like stand 54 flushes with an outer surface of the third casing 30, and such structure of the third casing 30 further reduces the volume of the module and reduces the height of the module. Upwarping engaging portions 34 are disposed on edge portions of both sides of the opening of the third casing 30, ultrasonic lines 32 are disposed on end faces of the engaging portions 34, downward-opening grooves 26 are disposed at positions of the lower end of the second casing 20 corresponding to engaging portions 34, the engaging portions 34 are inserted into the grooves 26, an ultrasonic line 32 is also disposed on an edge of one side of the third casing 30 corresponding to the side of the second casing 20 provided with the rear sound exit holes 60, and the second casing 20 is engaged with the third casing 30 in sealed manner by an ultrasonic wave welding process.

By employing an open-type rear acoustic cavity and using space between electronic elements in the interior of the electronic terminal, the present disclosure enhances the low-frequency performance of the module, prevents acoustic performance of sound short-circuiting and low-frequency distortion, substantially reduces the volume of the module while ensuring the acoustic performance of the module unchanged, provides an expansion space for other components in the electronic terminal, and enables the loudspeaker module to meet the needs of the light-weighted, thinner and slimmer electronic terminal.

In the description, the module with the above structure is taken as an example to illustrate the technical solutions about the open-type rear acoustic cavity and the chamfers on the sidewalls of the basin-like stand in the present disclosure. In practical application, this technical solution is not only adapted for the loudspeaker module with the above cuboid structure as well as for a loudspeaker module with a circular, track-shaped or square structure. Those skilled in the art may, according to the depictions of the description and without making any inventive efforts, apply the technical solution of the present disclosure to modules with other structures. Hence, no matter whether other structures of the module are identical with the module structure as described in the above embodiments, loudspeaker modules all fall within the protection scope of the present disclosure so long as the open-type rear acoustic cavity is employed to reduce the size of the module, and chamfers are provided on the sidewalls of the basin-like stand to improve air stream circulation.

Naming of the first casing, second casing and third casing involved in Embodiment 1 of the present disclosure is only intended to distinguish technical features, and does not represents an installation order, an operation order and positional relationship of the three casings.

The present disclosure is not limited to the above specific embodiments, and diverse variations made by those having ordinary skill in the art starting from the above concept without making any inventive efforts all fall within the protection scope of the present disclosure.

The invention claimed is:

1. A loudspeaker module, installed in an interior of an electronic terminal, comprising an outer casing in which a vibration system and a magnetic circuit system are received, the magnetic circuit system comprising a basin-like stand fixed on the outer casing, a magnet and a washer being fixed in turn in the basin-like stand, wherein, the outer casing comprises a second casing, the second casing is provided with an inner side surface, an outer side surface and an upper surface, a vibration system comprises a diaphragm, and an edge portion of the diaphragm is fixed on the upper surface; and the basin-like stand is fixed on the second casing, the basin-like stand comprises a bottom wall and a sidewall that is formed by bending from the bottom wall, the sidewall has an inner side surface and an outer side surface, the inner side surface of the second casing and the outer side surface of the sidewall of the basin-like stand recline together, the second casing is provided with a rear sound exit hole that transversely runs through the inner side surface and the outer side surface of the second casing at the position that is corresponding to the outer side surface of the sidewall of the basin-like stand, and the rear sound exit hole is communicated with an inner cavity of the module and an inner cavity of the electronic terminal; and a chamfered plane is disposed at an upper end of the sidewall of the basin-like stand corresponding to the rear sound exit hole, the chamfered plane is disposed on a side of the sidewall of the basin-like stand adjacent to the rear sound exit hole, and a sound emitting channel that is in communication with the inner cavity of the module and the rear sound exit hole is formed between the chamfered plane and the inner side surface of the second casing.

2. The loudspeaker module according to claim 1, wherein the module is a rectangular structure, and the chamfered plane is disposed on both sidewalls on opposite sides of the basin-like stand.

3. The loudspeaker module according to claim 2, wherein the outer casing comprises a first casing that is engaged with the second casing.

4. The loudspeaker module according to claim 3, wherein three said rear sound exit holes are equidistantly distributed on the sidewall on the same side of the second casing.

5. The loudspeaker module according to claim 4, wherein fixing flanges engaged with an upper end face of the sidewall of the basin-like stand are disposed inside the sidewall of the second casing provided with the rear sound exit holes, and are discontinuously disposed inside the second casing away from the respective rear sound exit holes.

6. The loudspeaker module according to claim 5, wherein a plurality of raised walls are discontinuously disposed at an upper end of the sidewall of a side of the second casing not provided with the rear sound exit holes, and upper end faces of the raised walls all flush with upper end faces of the remaining three sidewalls of the second casing; after the first casing is engaged with the second casing, spaces between the raised walls form front sound exit holes of the module.

7. The loudspeaker module according to claim 6, wherein the rear sound exit holes and the front sound exit holes are respectively disposed on opposite sides of the module.

8. The loudspeaker module according to claim 7, wherein a fixing flange engaged with the upper end face of the sidewall of the basin-like stand is further disposed inside the sidewall of the side of the second casing provided with the raised walls, and the fixing flange on said side is continuously disposed.

9. The loudspeaker module according to claim 8, wherein the module further comprises a third casing, the first casing is engaged with an upper end of the second casing, and the third casing is engaged with a lower end of the second casing.

10. The loudspeaker module according to claim 9, wherein the third casing is a frame structure with an opening on one side, the opening side of the third casing corresponds to the side of the second casing provided with the raised walls, upwarping engaging portions are disposed on the opening side of the third casing, and grooves for receiving the engaging portions are disposed at positions of a lower end of the second casing corresponding to the engaging portions.

* * * * *